US012618928B2

(12) United States Patent
Hustava

(10) Patent No.: US 12,618,928 B2
(45) Date of Patent: May 5, 2026

(54) SENSOR ARRAY MODULE FOR AN ADVANCED DRIVER ASSISTANCE SYSTEM

(71) Applicant: SEMICONDUCTOR COMPONENTS INDUSTRIES, LLC, Scottsdale, AZ (US)

(72) Inventor: Marek Hustava, Bratislava (SK)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 397 days.

(21) Appl. No.: 18/468,207

(22) Filed: Sep. 15, 2023

(65) Prior Publication Data

US 2024/0255600 A1 Aug. 1, 2024

Related U.S. Application Data

(60) Provisional application No. 63/482,193, filed on Jan. 30, 2023.

(51) Int. Cl.
*G01S 3/46* (2006.01)
*B60W 40/10* (2012.01)

(52) U.S. Cl.
CPC ............... *G01S 3/46* (2013.01); *B60W 40/10* (2013.01); *B60W 2420/54* (2013.01); *B60W 2554/4049* (2020.02)

(58) Field of Classification Search
CPC .. G01S 7/48; G01S 3/46; B60R 25/18; B60W 40/10; B60W 2554/4049; B60W 2420/54
See application file for complete search history.

(56) References Cited

U.S. PATENT DOCUMENTS 9,609,482 B1 * 3/2017 Want ................... H04W 36/322
10,545,219 B2 * 1/2020 Przybyla ................. G01S 11/16
(Continued)

FOREIGN PATENT DOCUMENTS

DE     102013211419 A1     12/2014
DE     102015211710 A1     12/2016
(Continued)

OTHER PUBLICATIONS

Castellanos, Lenny , "MEMS-Ultraschallwandler von Fraunhofer für die Produktionstechnik von morgen", TechBlog des Fraunhofer ISIT, Jun. 16, 2021, URL: https://www.isit.fraunhofer.de/de/newsroom/techblog/2021/05/MEMS_Ultraschallwandler.html, 9 pages (with full English translation).

(Continued)

*Primary Examiner* — Hoi C Lau
(74) *Attorney, Agent, or Firm* — Brake Hughes Bellermann LLP

(57) ABSTRACT
A smart ultrasonic integrated-circuit that allows at least one MEMS device to be combined with a piezoelectric transducer in a sensor array module. The sensor array module is capable of additional functionality for an advanced driver assistance system. For example, the MEMS device can add functionality because its wide bandwidth allows for simultaneous detection of audio signals and ultrasonic signals. Accordingly, the sensor array module may provide dual-mode (audio and ultrasonic) sensing in a single module. Additionally the size/cost of a MEMS device allows for the use of a two-dimensional array for receiving ultrasonic echoes which can add a dimension to the ultrasonic range detection for a vehicle.

21 Claims, 9 Drawing Sheets

(56) References Cited

U.S. PATENT DOCUMENTS

| | | | | |
|---|---|---|---|---|
| 10,698,084 | B2 * | 6/2020 | Mielenz | G01S 7/539 |
| 10,698,094 | B2 * | 6/2020 | Rudoy | G01S 15/46 |
| 11,041,952 | B2 * | 6/2021 | Sestok, IV | G01S 7/527 |
| 11,217,235 | B1 * | 1/2022 | Chu | H04R 1/406 |
| 11,368,497 | B1 * | 6/2022 | Sathyanarayana Rao | H04L 67/12 |
| 11,501,794 | B1 * | 11/2022 | Kim | G10L 15/1815 |
| 11,789,457 | B1 * | 10/2023 | Woo | H04R 3/005 |
| | | | | 700/253 |
| 11,989,026 | B1 * | 5/2024 | Wang | G05D 1/617 |
| 12,002,458 | B1 * | 6/2024 | Gao | G10L 15/22 |
| 12,117,838 | B1 * | 10/2024 | Sigurdsson | G10L 15/22 |
| 12,288,566 | B1 * | 4/2025 | Ganguly | G10L 21/0264 |
| 12,456,469 | B1 * | 10/2025 | Ganguly | G06V 40/161 |
| 2018/0081055 | A1 | 3/2018 | Guenzel et al. | |
| 2018/0143292 | A1 * | 5/2018 | Przybyla | G01S 5/18 |
| 2018/0180732 | A1 * | 6/2018 | Sestok, IV | G01S 15/36 |
| 2019/0187244 | A1 * | 6/2019 | Riccardi | G01S 5/186 |
| 2019/0242985 | A1 | 8/2019 | Ishii et al. | |
| 2020/0166603 | A1 * | 5/2020 | Przybyla | G06F 3/00 |
| 2021/0132204 | A1 | 5/2021 | Caspall | |
| 2024/0255600 | A1 * | 8/2024 | Hustava | G01S 15/872 |
| 2025/0056164 | A1 * | 2/2025 | Littrell | G01P 15/0922 |
| 2025/0102651 | A1 * | 3/2025 | Hustava | G01S 7/521 |
| 2025/0110225 | A1 | 4/2025 | White et al. | |
| 2025/0244455 | A1 * | 7/2025 | Hustava | G01S 15/931 |

FOREIGN PATENT DOCUMENTS

| | | |
|---|---|---|
| DE | 102018205661 A1 | 10/2019 |
| WO | 2021069679 A1 | 4/2021 |

OTHER PUBLICATIONS

"High-performance MEMS microphone with extended frequency response up to 80 kHz for ultrasound applications", Datasheet MEMS microphone IMP23ABSU; Sep. 2020; URL: https://cdn-reichelt.de/documents/datenblatt/A200/3158459.pdf, 15 pages.

Displacido, et al., "Enhancement of ultrasonic de-icing via tone burst excitation", Journal of Aircraft, vol. 53, No. 6, Nov.-Dec. 2016, pp. 1821-1829.

* cited by examiner

SENSOR ARRAY MODULE FOR AN ADVANCED DRIVER ASSISTANCE SYSTEM

CROSS-REFERENCE TO RELATED APPLICATION

This application claims the benefit of U.S. Provisional Application, No. 63/482,193, filed on Jan. 30, 2023, which is hereby incorporated by reference in its entirety.

FIELD OF THE DISCLOSURE

The present disclosure relates to an advanced driver assistance system (ADAS) and more specifically to a sensor array module that includes a smart ultrasound smart ultrasonic (ULS) integrated-circuit (IC).

BACKGROUND

ADAS sensors can provide information to help a driver and enhance the safety of the driver and passengers. A plurality of different sensors may be installed around a perimeter of a vehicle to provide information to recognize the environment around the car. The sensors may be based on camera, lidar, radar, and ultrasonic sensors based on the application.

SUMMARY

In some aspects, the techniques described herein relate to a smart ultrasonic integrated-circuit, including: a transmitter coupled to a piezoelectric transducer configured to transmit an ultrasonic-transmit-signal towards an obstacle; a first receiver configured to receive a first receive-signal from a first MEMS device, the first receive-signal including a first ultrasonic portion and a first audio portion; a second receiver configured to receive a second receive-signal from a second MEMS device, the second receive-signal including a second ultrasonic portion and a second audio portion; and a processor configured to: process the first ultrasonic portion of the first receive-signal and the second ultrasonic portion of the second receive-signal to determine two-dimensional range information for the obstacle; process the first audio portion of the first receive-signal and the second audio portion of the second receive-signal to determine audio information for a sound source; and output the two-dimensional range information and the audio information.

In some aspects, the techniques described herein relate to a smart ultrasonic integrated-circuit, wherein the processor is further configured to: capture a first ultrasonic-echo included in the first receive-signal; capture a second ultrasonic-echo included in the second receive-signal; determine a phase shift between the first ultrasonic-echo and the second ultrasonic-echo; and determine a time-of-flight based on the first ultrasonic-echo or the second ultrasonic-echo.

In some aspects, the techniques described herein relate to a smart ultrasonic integrated-circuit, wherein the processor is further configured to: output the time-of-flight and the phase shift as the two-dimensional range information.

In some aspects, the techniques described herein relate to a smart ultrasonic integrated-circuit, wherein the processor is further configured to: determine a range to the obstacle based on the time-of-flight; determine a height of the obstacle based on the phase shift; and output the range and the height as the two-dimensional range information.

In some aspects, the techniques described herein relate to a smart ultrasonic integrated-circuit, wherein the processor is further configured to: capture an audible sound included in the first receive-signal or the second receive-signal.

In some aspects, the techniques described herein relate to a smart ultrasonic integrated-circuit, wherein the processor is further configured to: output raw audio-data corresponding to the audible sound as the audio information.

In some aspects, the techniques described herein relate to a smart ultrasonic integrated-circuit, wherein the processor is further configured to: classify the audible sound to determine an identity of the sound source; and output the identity as the audio information.

In some aspects, the techniques described herein relate to a smart ultrasonic integrated-circuit, wherein the first receiver is configured to capture the first ultrasonic portion of the first receive-signal and the first audio portion of the first receive-signal simultaneously; and the second receiver is configured to capture the second ultrasonic portion of the second receive-signal and the second audio portion of the second receive-signal simultaneously.

In some aspects, the techniques described herein relate to a sensor array module for an advanced driver assistance system (ADAS) including: a piezoelectric transducer; a first MEMS device; a second MEMS device; and a smart-ultrasound integrated-circuit including: a transmitter coupled to the piezoelectric transducer, the piezoelectric transducer configured to transmit an ultrasonic-transmit-signal towards an obstacle; a first receiver configured to receive a first receive-signal from the first MEMS device, the first receive-signal including a first ultrasonic portion and a first audio portion; a second receiver configured to receive a second receive-signal from the second MEMS device, the second receive-signal including a second ultrasonic portion and a second audio portion; and a processor configured to: capture a first ultrasonic-echo included in the first ultrasonic portion of the first receive-signal; capture a second ultrasonic-echo included in the second ultrasonic portion of the second receive-signal; capture an audible sound from the first audio portion of the first receive-signal or from the second audio portion of the second receive-signal; compute two-dimensional range information based on the first ultrasonic-echo and the second ultrasonic-echo; compute audio information based on the audible sound; and transmit the two-dimensional range information and the audio information to an engine control unit of a vehicle.

In some aspects, the techniques described herein relate to a sensor array module, wherein the two-dimensional range information includes: a phase shift between the first ultrasonic-echo and the second ultrasonic-echo.

In some aspects, the techniques described herein relate to a sensor array module, wherein the two-dimensional range information includes: a height of the obstacle based on a phase shift between the first ultrasonic-echo and the second ultrasonic-echo.

In some aspects, the techniques described herein relate to a sensor array module, wherein the audio information includes: raw audio-data corresponding to the audible sound.

In some aspects, the techniques described herein relate to a sensor array module, wherein the audio information includes: an identity of a sound source of the audible sound.

In some aspects, the techniques described herein relate to a sensor array module, wherein: the first MEMS device and the second MEMS device define a vertical MEMS array with a spacing that is less than one wavelength of the ultrasonic-transmit-signal, the vertical MEMS array being at a surface of the vehicle and aligned in a direction parallel to a height of a curb.

In some aspects, the techniques described herein relate to a sensor array module, wherein the processor is further configured to: receive a leakage signal from the first MEMS device or the second MEMS device while the piezoelectric transducer is transmitting; and analyze the leakage signal to determine an operating characteristic of the piezoelectric transducer.

In some aspects, the techniques described herein relate to a sensor array module, wherein the smart-ultrasound integrated-circuit further includes: a temperature sensor; and a memory that is configured to store a calibration file corresponding to an offset phase-shift between the first MEMS device and the second MEMS device over a range of temperatures.

In some aspects, the techniques described herein relate to a sensor array module, wherein the engine control unit is configured to perform a park assist operation based on the two-dimensional range information.

In some aspects, the techniques described herein relate to a sensor array module, wherein the engine control unit is configured to generate an emergency vehicle warning based on the audio information.

In some aspects, the techniques described herein relate to a smart ultrasonic integrated-circuit, including: a transmitter coupled to a piezoelectric transducer configured to transmit an ultrasonic-transmit-signal towards an obstacle; a first receiver configured to receive a first receive-signal from the piezoelectric transducer, the first receive-signal including a first ultrasonic-echo; a second receiver configured to receive a second receive-signal from a MEMS device, the second receive-signal including a second ultrasonic-echo and an audio signal; and a processor configured to: determine a two-dimensional range based on the first ultrasonic-echo and the second ultrasonic-echo; determine audio information based on the audio signal; and output the two-dimensional range and the audio information.

In some aspects, the techniques described herein relate to a smart ultrasonic integrated-circuit, wherein the processor is further configured to: capture a leakage signal included in the second receive-signal, the leakage signal received by the MEMS device while the piezoelectric transducer is in a transmit mode; and determine an operating characteristic of the piezoelectric transducer based on the leakage signal.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
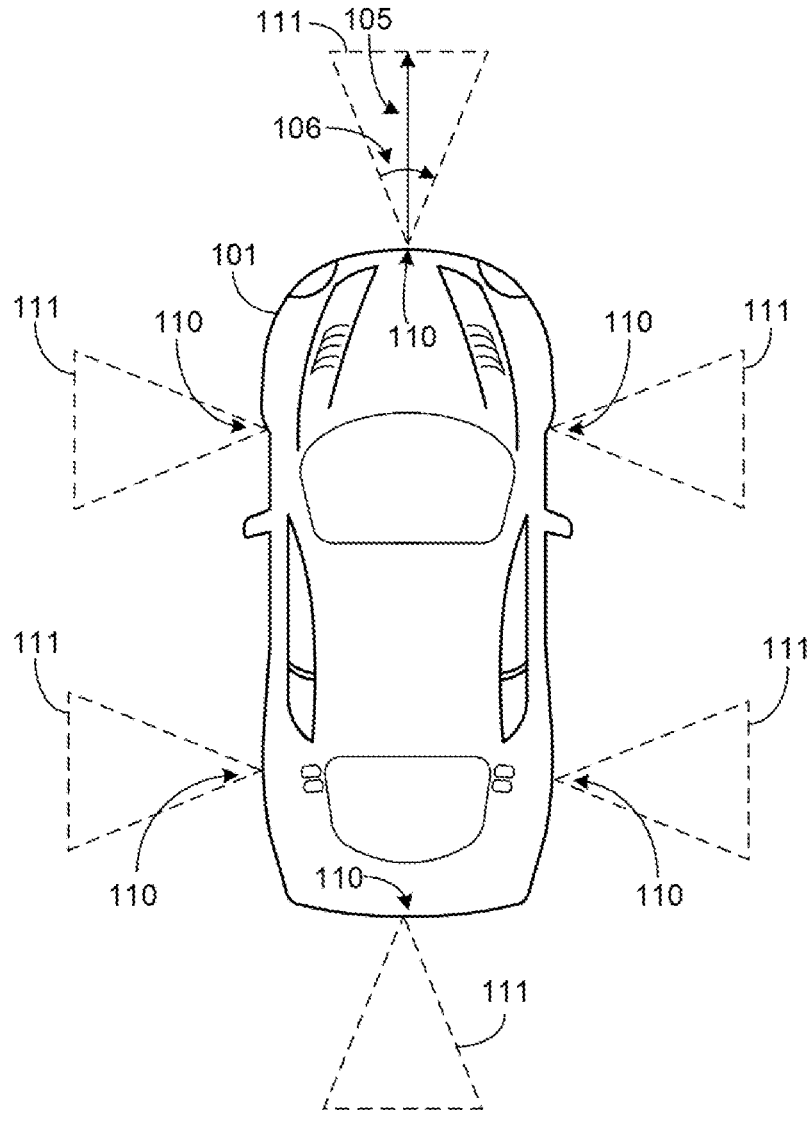
FIG. 1 is a top view of a vehicle equipped with an advanced driver assistance system according to a possible implementation of the present disclosure.

FIG. 1 is a top view of a vehicle 101 equipped with an advanced driver assistance system (ADAS) according to a possible implementation of the present disclosure. The ADAS uses a sensor array module 110 for detecting obstacles (e.g., objects). Duplicates of the sensor array module 110 can be positioned (i.e., installed) at a plurality of locations around the outer surface of the vehicle 101 so that each sensor array module 110 monitors its corresponding portion of the environment for obstacles.

The arrangement shown in FIG. 1 is only one example but illustrates that the combined sensing area (i.e., coverage) of identical sensor modules installed around a perimeter of a vehicle is determined by a few things. First, the more sensor modules in the ADAS, the greater the coverage. Second, the larger the field-of-view 111 (i.e., range 105, angular view 106) of each sensor array module 110, the greater the coverage. While desirable, increasing coverage may face a few problems. For example, installing a larger number of sensor modules around the vehicle may negatively affect cost (e.g., too expensive), space (e.g., too large), and aesthetics (e.g., too noticeable).

One technical problem associated with the cost/space limitations is that an ADAS may not operate reliably in some scenarios when the coverage of the sensor modules is limited. For example, each sensor array module 110 may be an ultrasonic sensor including a piezoelectric transducer (i.e., PZT). A conventional PZT may have limited coverage because of a relatively narrow angular view 106. The limited coverage may decrease its ability to detect low-height obstacles, such as curbs, at close ranges (e.g., <10 cm). Further, a curb, having a long length, can create a large ultrasonic echo despite its low-height, and the large ultrasonic echo can confuse the ADAS to determine a larger obstacle is present, which can trigger automatic braking unnecessarily. As a result, a sensor array module 110 based on a (single) PZT may limit the performance of a park assist application.

Another technical problem associated with the cost/space limitations is that the ADAS may not be able to support additional sensing modalities. For example, sensing audible sounds could help an ADAS system respond to a siren of an emergency vehicle or a voice of an observer yelling "stop!" (e.g., while the vehicle is in reverse). Adding audio sensors (e.g., microphones) to the vehicle may be impractical or undesirable based on the cost, space, and aesthetic concerns mentioned above, especially in a consumer vehicle.

The present disclosure describes a sensor module that addresses (at least) these technical problems. In particular, a sensor module is disclosed, which uses an array of ultrasonic receivers to determine range data that includes both range and height of an obstacle (i.e., two-dimensional range information). The disclosed sensor array module further uses at least one microelectromechanical system (MEMS) device as a transducer, which can (simultaneously) sense (i) audio signals and (ii) ultrasonic (i.e., ultrasound) signals from an environment. The disclosed sensor array module includes a smart ultrasonic integrated-circuit to accommodate the added modality and to perform the processing necessary for the additional measurements (e.g., obstacle height, sounds).

In particular, the MEMS device of the sensor array module offers a variety of enhancements over conventional ADAS sensing. The bandwidth of the MEMS device is large (e.g., 100 Hz<f<100 KHz), which enables multi-mode (e.g., audible, ultrasonic) sensing and doppler detection over a wide range of vehicle speeds (e.g., +/−50 kmph). The viewing angle of the MEMS can be large enough (e.g., ≥150 degrees) to sense small (i.e., 25 cm height) obstacles at close ranges (e.g., 7 cm<R<1 m).

The size of the MEMS device sensor(s) can be smaller than a comparable PZT, which can address size and aesthetic concerns. Further, the small size (e.g., 1 mm$^2$) of the MEMS device allows a first MEMS device sensor to be positioned close enough (e.g., 0.7 mm) to another sensor (e.g., PZT or second MEMS device sensor) to (unambiguously) correlate a phase shift ($\Delta\phi$) between echoes received at each sensor. In other words, the MEMS device facilitates the use of a 2D ultrasonic array to capture 2D range information corresponding to an obstacle (i.e., object, target). For example, the 2D range information can include a range to the obstacle and a height of the obstacle.

The enhancements described above can have the technical effect of improving a variety of ADAS applications, including (but not limited to) automatic parking, assisted parking, emergency-vehicle detection, and the like.

Figure 2:
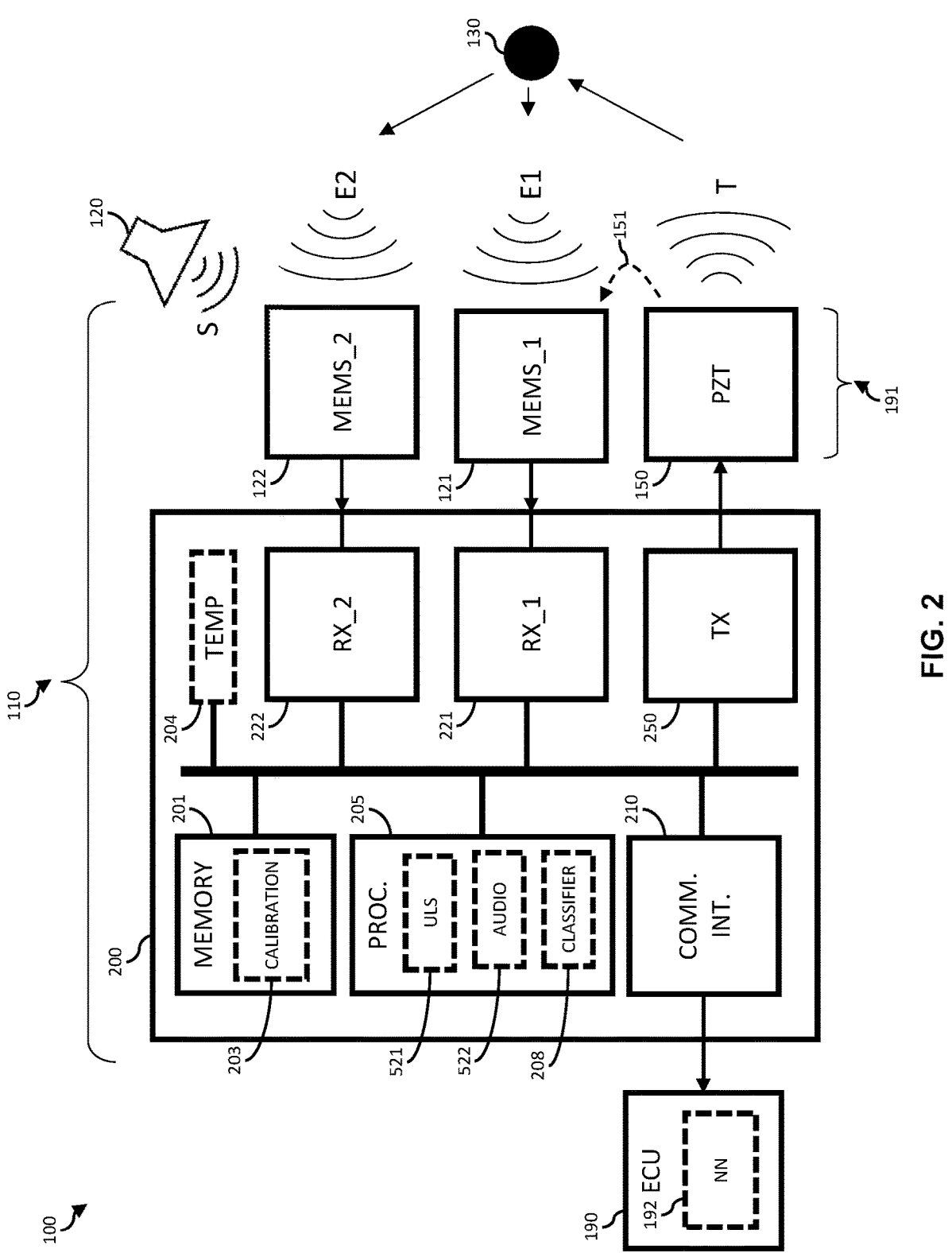
FIG. 2 is a block diagram of a sensor array module for an advanced driver assistance system according to a first possible implementation of the present disclosure.

FIG. 2 is a block diagram of a sensor array module 110 for an advanced driver assistance system 100 according to a first possible implementation of the present disclosure. As shown, the sensor array module 110 includes a smart ultrasonic integrated-circuit 200. The smart ultrasonic integrated-circuit 200 may be configured to function as a versatile interface between transducers 191 and a controller (e.g., engine control unit (ECU 190)) for the vehicle. Accordingly, the smart ultrasonic integrated-circuit 200 may be configured to exchange (i.e., communicate) analog signals with the transducers 191 and exchange (i.e., communicate) digital signals to/from the ECU 190.

The transducers 191 include a PZT 150. The PZT 150 is configured to transmit an ultrasonic-transmit-signal towards an obstacle 130 (in field-of-view 111 of FIG. 1). The transmission may occur for a transmit period. During the transmit period, the PZT may be in a transmit mode. In the transmit mode, an electrical signal (e.g., sinusoidal voltage) at an ultrasonic frequency from a transmitter 250 can mechanically move the PZT according to the piezoelectric effect. Accordingly, the smart ultrasonic integrated-circuit 200 includes a transmitter 250 (TX) coupled to the PZT 150 to cause the PZT to move, which creates a pressure wave at the ultrasonic frequency. The pressure wave and the signal from the transmitter 250 may be referred to interchangeably as the ultrasonic-transmit-signal (T). After the transmit period, the transducers 191 may be configured to listen for (i.e., receive) an echo of the ultrasonic-transmit-signal reflected back to the transducers 191 from an obstacle 130.

The transducers 191 can further include a first MEMS device 121 and a second MEMS device 122. The first MEMS device 121 and the second MEMS device 122 may be identical in their design. For example, the first MEMS device 121 and second MEMS device 122 can include respective membranes that are mechanically moved by pressure waves of ultrasonic echoes (E1, E2) received at each device. The membrane of each MEMS device may be part of a capacitor so that its movement can generate a time-varying voltage corresponding to the ultrasonic pressure waves generated by the echoes (E1, E2). It should be noted that the first echo 321 (E1) and the second echo 322 (E2) may be different portions of the same echo pressure-wave generated (i.e., reflected) by the obstacle 130.

Figure 3:
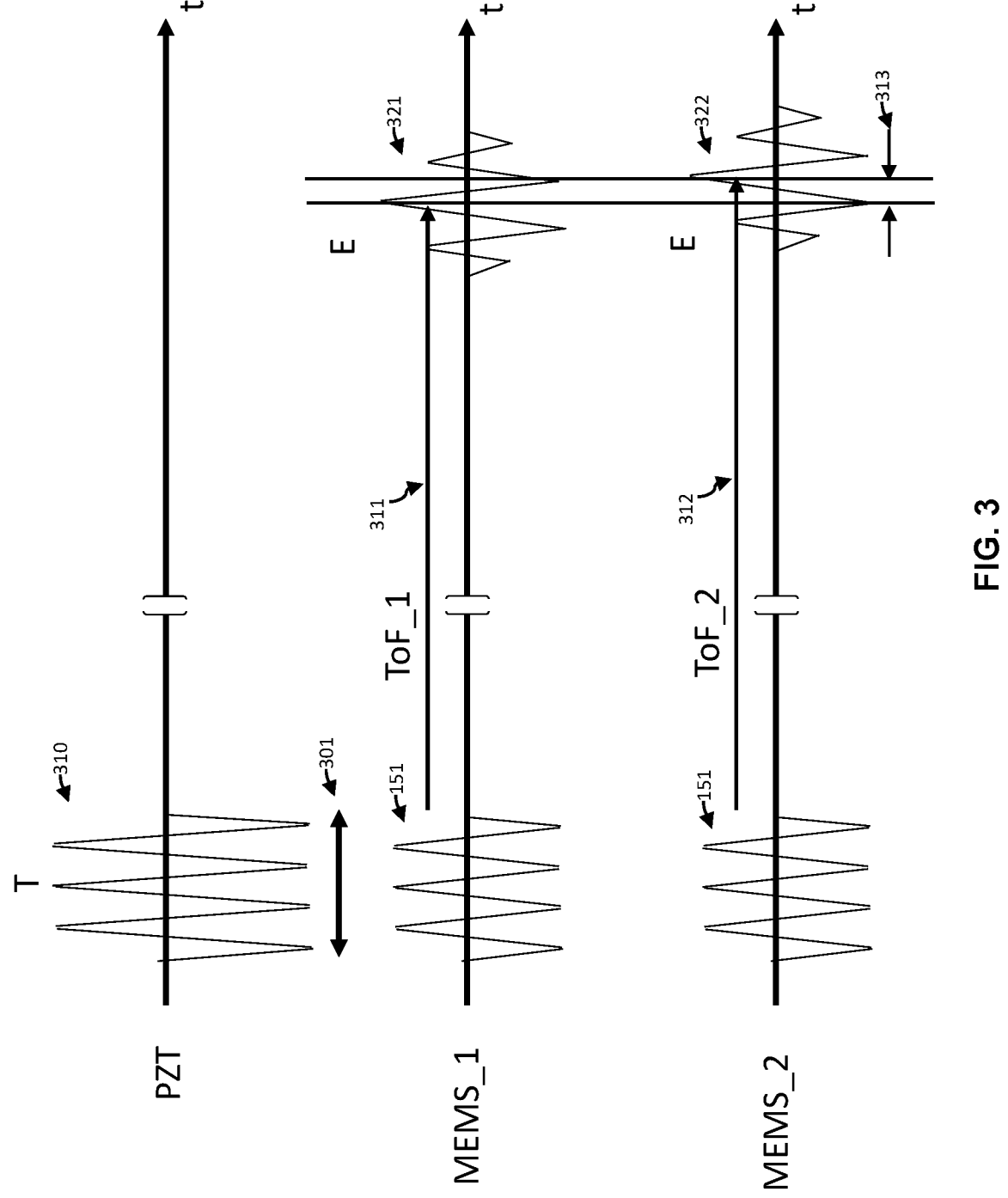
FIG. 3 includes graphs of ultrasonic signals of the transducers of a sensor array module according to a possible implementation of the present disclosure.

FIG. 3 includes graphs of ultrasonic signals of the transducers of a sensor array module according to a possible implementation of the present disclosure. As shown, during a transmit period 301 a PZT generates an ultrasonic-transmit-signal 310 (T). After a first time-of-flight 311 (ToF_1) the first MEMS device (MEMS_1) receives an echo 321 (E). After a second time-of-flight 312 (ToF_2) the second MEMS device (MEMS_2) receives the echo 322 (E). The first time-of-flight 311 and the second time-of-flight 312 correspond to respective ranges between the MEMS device and the obstacle 130 (FIG. 2). The echo at each MEMS device may be compared to determine a phase shift 313. The phase shift 313 can be used to determine a position of the obstacle 130 relative to the array.

A first ultrasonic-echo received by the first MEMS device or second ultrasonic-echo received by the second MEMS device may be used to determine a range to an obstacle based on a time-of-flight. Further, the first echo 321 and the second echo 322 may be compared to determine a phase shift. Alternatively, the difference between the first time-of-flight 311 and the second time-of-flight 312 may be computed to determine the phase shift. In either case, the phase shift may be used to compute position (i.e., displacement) of the obstacle along a direction defined by the MEMS array (i.e., along a straight line connecting the first MEMS device and the second MEMS device).

Figure 4B:
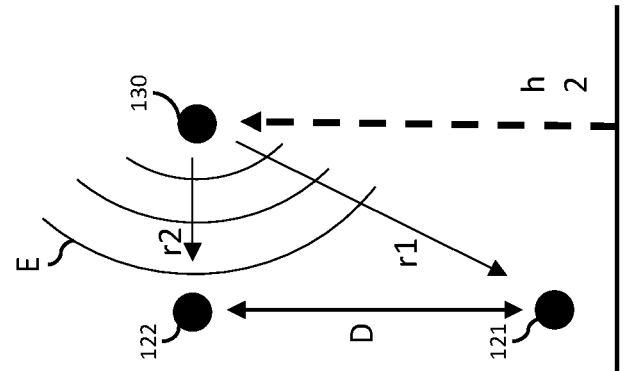
FIGS. 4A and 4B illustrate spatial relationships between a sensor array and an obstacle at different heights according to possible implementations of the present disclosure.
Figure 4B:
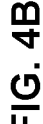
Figure 4A:
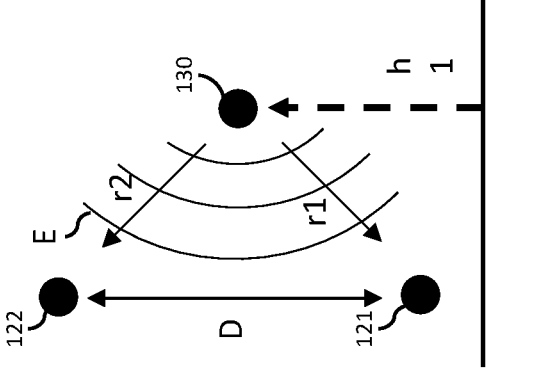

FIGS. 4A and 4B illustrate spatial relationships between a sensor array and an obstacle at different heights according to possible implementations of the present disclosure. FIG. 4A illustrates a configuration in which the obstacle 130 is at a first height (h1), which positions it midway between the first MEMS device 121 and the second MEMS device 122. In this configuration, the phase of the ultrasonic echo (E) received at the first MEMS device 121 (i.e., the first ultrasonic echo) is equal to the phase of the ultrasonic echo (E) received at the second MEMS device 122 (i.e., the second ultrasonic echo) because the propagation range to each is identical (i.e., r1=r2). In other words, when the obstacle 130 is at the first height (h1) the phase shift is zero ($\Delta\phi$=0). This zero phase shift height may be considered a reference height to which all other heights may be compared because as the obstacle is raised or lowered, the phase shift will become non-zero and have a sign corresponding to it being raised or lowered in relation to the reference height.

FIG. 4B illustrates a configuration in which the obstacle 130 is at a second height (h2), which positions it closer to the second MEMS device 122 and farther from the first MEMS device 121. In this configuration, the ultrasonic echo (E) may be received at the second MEMS device 122 before it is received at the first MEMS device 121 because the propagation range to the second MEMS device 122 is shorter than the propagation range to the first MEMS device 121.

The different times of arrival result in a phase shift, which corresponds to the second height. The different times of arrival may correspond to a direction from which the wave-front of the ultrasonic pressure wave arrives at the MEMS array. The direction, which may correspond to the height, can be calculated using the array spacing (D) and the wavelength ($\lambda$) of the ultrasonic-transmit-signal. For this measurement, the MEMS device of the array is arranged along a direction corresponding to the displacement to be measured (e.g., vertical direction=height) and the spacing (D) is made less than the wavelength of the ultrasonic-transmit-signal (e.g., D=$\lambda$/2).

In a possible implementation, the smart ultrasonic inte-grated-circuit 200 may be configured to output 2D range information to an ECU 190. The smart ultrasonic integrated-circuit 200 may be configured to output 2D range informa-tion in a variety of ways. In a first implementation, the 2D range information output by the smart ultrasonic integrated-circuit 200 is output magnitude data and phase shift data. For example, the received signal (e.g., see first echo 321, second echo 322 of FIG. 3) may be filtered by a constant false alarm rate (i.e., CFAR) filter to generate a CFAR echo magnitude. In this implementation, the ECU 190 (FIG. 2) may be configured to perform the processing necessary to determine the range and height of the obstacle 130 based on the CFAR echo magnitude signal (i.e., magnitude data) and echo phase signal (i.e., phase shift data) from each receiver. In other words, in the first implementation, the processing to gener-ate ADAS information may occur at the ECU 190. In a second implementation, the processor 205 (FIG. 2) of the smart ultrasonic integrated-circuit 200 may be configured to compute the range and the height of the obstacle 130. In this implementation, the 2D range information output by the smart ultrasonic integrated-circuit 200 is output as a com-puted range and height. In other words, in the second implementation, the processing to generate ADAS informa-tion may occur at the smart ultrasonic integrated-circuit 200.

The smart ultrasonic integrated-circuit 200 and the ECU 190 can split the processing of the 2D range information, which can allow for the sensor array module 110 to be used in a variety of processing environments. In some implemen-tations, the ECU 190 may be better configured for complex classification. For these implementations, raw data may be transmitted to the ECU 190 for classification. For example, the ECU 190 may be configured with a neural network 192 (FIG. 2) configured to output a determination (e.g., control signal, alert) based on the raw data, along with possibly other information (e.g., optical sensor data).

Returning to FIG. 2, during the transmit period 301 (FIG. 3) of the PZT 150, the first MEMS device 121 and/or the second MEMS device 122 can receive a leakage signal 151 corresponding to the ultrasonic-transmit-signal 310 (FIG. 3). The leakage signal 151 may be useful for monitoring the status of the PZT, which may change over time (e.g., age, temperature). Accordingly a processor 205 of the smart ultrasonic integrated-circuit 200 may be configured to deter-mine an operating characteristic (e.g., wavelength of the ultrasonic-transmit-signal from the PZT) based on the leak-age signal 151.

The leakage signal 151 may also be used to for monitoring the condition of a receiver (or receivers) of the smart ultrasonic integrated-circuit 200. For example, one or both MEMS channels may lose sensitivity or become inoperable during use (e.g., due to debris or damage). Once detected, this condition could trigger the smart ultrasonic integrated-circuit 200 to reconfigure how signals are received and/or how received signals are processed. In a first possible scenario, the smart ultrasonic integrated-circuit 200 can reconfigure the PZT 150 to receive signals when the first MEMS device 121 and/or the second MEMS device 122 becomes inoperable. If only one receiver is available, the smart ultrasonic integrated-circuit 200 can be reconfigured to output one-dimensional range information instead of two-dimensional range information. This ability to diagnose and respond to changes in the operating/sensitivity of the multiple receivers can provide safety to the ADAS of the vehicle by maintaining operation even in a degraded con-dition, and can provide useful information to a driver (e.g., message to clean or service sensor).

A calibration file (i.e., calibration 203) stored in a memory 201 of the smart ultrasonic integrated-circuit 200 may also help determine an operating characteristic. In a possible implementation, the calibration can be factory set and stored in the memory 201 of the smart ultrasonic integrated-circuit 200. For example, the calibration 203 may be a look-up table that includes an offset phase-shift between receive-signals at the MEMS device, which is generated regardless of a height of the obstacle 130. The offset phase-shift may be due to intrinsic differences between the first MEMS device 121 and the second MEMS device 122, which may change according to a temperature. Accordingly, the memory 201 may store a calibration 203 (e.g., look-up table) corresponding to the offset phase-shift between the first MEMS device 121 and the second MEMS device 122 over a range of temperatures. In a possible implementation, the smart ultrasonic inte-grated-circuit 200 includes a temperature sensor 204, and the processor 205 is configured to access the calibration 203 based on the sensed temperature in order to apply (e.g., subtract) an appropriate offset phase-shift from a phase shift determined between a first receive signal and a second receive-signal.

The first MEMS device 121 and the second MEMS device 122 may also receive a sound (S) from a sound source 120. A first receiver 221 of the smart ultrasonic integrated-circuit 200 is coupled to the first MEMS device 121 and receives a first receive-signal, which can include both ultrasonic sig-nals and audio signals. In other words, the first receive-signal can have an ultrasonic portion (i.e., echo, leakage) and an audio portion (i.e., sound). A second receiver 222 of the smart ultrasonic integrated-circuit 200 is coupled to the second MEMS device 122 and receives a second receive-signal, which can also include both ultrasonic signals and audio signals. In other words, the second receive-signal can have an ultrasonic portion (i.e., echo, leakage) and an audio portion (i.e., sound). The ultrasonic signals of the first receive-signal may be different than the ultrasonic signals of the second receive-signal, and the audio signals of the first receive-signal may be different than the audio signals of the second receive signal. In other words, the first receive-signal can include a first ultrasonic portion and a first audio portion, and the second receive-signal can include a second ultra-sonic portion and a second audio portion.

Figure 5:
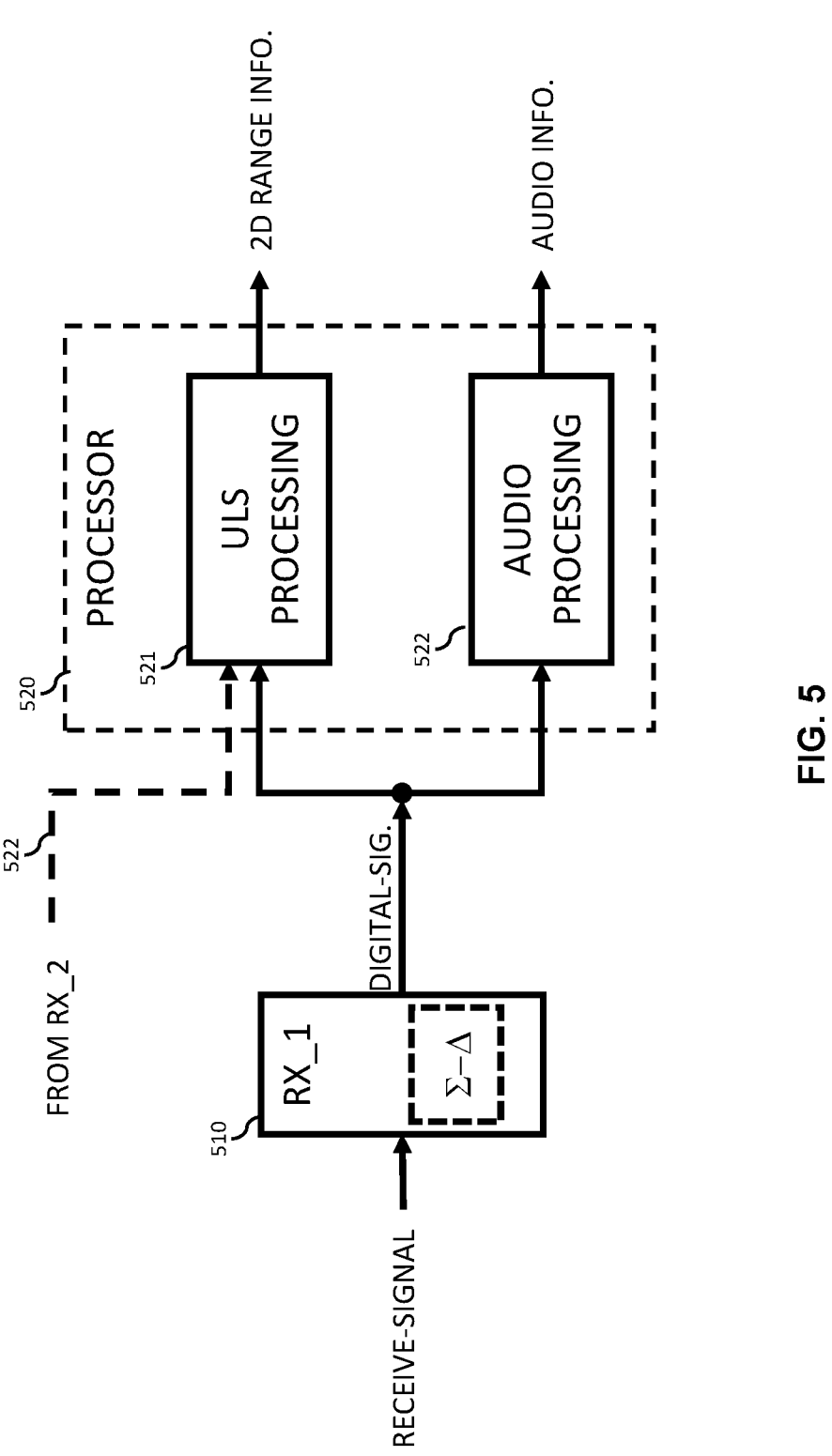
FIG. 5 is a block diagram illustrating details of a receive portion of a sensor array module according to a possible implementation of the present disclosure.

FIG. 5 is a block diagram illustrating details of a receive portion of a sensor array module according to a possible implementation of the present disclosure. For example, the components shown may be included as part of the smart ultrasonic integrated-circuit 200 of FIG. 2. As shown in FIG. 5, a receiver 510 (of a smart ultrasonic integrated-circuit 200 is configured to receive a receive-signal from one of the transducers 191. The receiver 510 can have operating char-acteristics (e.g., bandwidth, dynamic range) to enable receiving from a variety of different types or models of transducers. For example, the receiver 510 can receive the receive-signal from a MEMS device. In this case, the receive signal may include different frequency components over the wide spectral bandwidth of the MEMS device. For example, the receive signal may include ultrasonic (i.e., ULS) signals in an ultrasonic portion (e.g., 30 KHz<f<80 KHz) of a sound spectrum (i.e., spectrum) of the receive signal and may further include audio signals in an audio portion (e.g., 100 Hz<f<8 KHz) of a sound spectrum (i.e., spectrum) the receive signal.

The receiver 510 may include an analog-to-digital converter (i.e., ADC) with a bandwidth and dynamic range capable of capturing both the audio and ultrasonic components of the receive-signal. For example, the receive signal may include a sigma-delta ($\Sigma$-$\Delta$) converter configured to generate the digital signal for processing.

The processing described herein may be implemented in digital electronic circuitry, or in computer hardware, firmware, software, or in combinations thereof. For example, the processing may be implemented as computer programs including instructions stored and recalled from memory 201 of the smart ultrasonic integrated-circuit 200 may configure a processor 205 of the smart ultrasonic integrated-circuit 200 to carry out processes related to the ultrasonic portion and/or audio portion of the receive signal. The computer programs may be written in any form of programming language, including compiled or interpreted languages, and may be deployed in any form, including as a standalone program or as a module, component, subroutine, or other unit suitable for use in a computing environment.

As shown in FIG. 5, the digital signal may be transmitted to a processor 520 for processing the audio and the ultrasonic portions of the receive signal. For example, the processor 520 may be configured to have ultrasonic processing 521 and audio processing 522. The digital signal may be split so that the ultrasonic processing 521 and the audio processing 522 occur in parallel (i.e., simultaneously).

The ultrasonic processing 521 may include receiving the digital-signal from the receiver 510 (e.g., first receiver (RX_1) of the smart ultrasonic integrated-circuit 200. The ultrasonic processing 521 may further include filtering the digital-signal to capture the ultrasonic portion (e.g., 30 KHz<f<80 KHz) from the receive signal. The filtered digital signal may include an ultrasonic-echo corresponding to a pressure wave reflected form an obstacle (e.g., see FIG. 3). The ultrasonic processing 521 may further include determining a time-of-flight from the ultrasonic-echo.

The digital signal described above may be a first digital-signal corresponding to a first receive-signal from a first transducer (e.g., MEMS_1) of a transducer array (e.g., MEMS array), and the ultrasonic processing 521 may further include receiving a second digital-signal corresponding to a second receive-signal from a second transducer (e.g., MEMS_2) of the transducer array. In this case, the ultrasonic processing 521 may further include filtering the second digital-signal to capture the ultrasonic portion (e.g., 30 KHz<f<80 KHz) of the second receive-signal. The filtering may capture a second ultrasonic-echo from the second receive-signal.

The second ultrasonic-echo from the second-receive signal (i.e., captured by the second receiver) may be a delayed version of the ultrasonic-echo (i.e., first ultrasonic-echo) captured from the first receive-signal (i.e., captured by the first receiver). In other words, the first ultrasonic-echo and the second ultrasonic-echo are reflections of a transmitted ultrasonic signal from an obstacle received at two spatially separated transducers. The ultrasonic processing 521 may further include determining a phase shift between the first ultrasonic-echo and the second ultrasonic-echo to determine a position (e.g., height) of the obstacle relative to the spatially separated transducers.

In a first possible implementation, the ultrasonic processing 521 may include outputting the time-of-flight and the phase shift as 2D range information for the obstacle. In a second possible implementation, the ultrasonic processing 521 may include outputting a range to the obstacle, determined by the time-of-flight, and a height of the obstacle, determined by the phase shift, as the 2D range information for the obstacle.

The audio processing 522 of the processor 520 may include receiving the digital-signal from the receiver 510 (e.g., first receiver (RX_1) of the smart ultrasonic integrated-circuit 200. The audio processing 522 may further include filtering the digital-signal to capture the audio portion (e.g., 100 Hz<f<8 KHz) from the receive signal. The audio processing 522 may further include capturing an audible sound from the digital signal (e.g., from RX_1 or RX_2). Capturing the audible sound may include segmenting (e.g., isolating) a stream of audio samples corresponding to the sound.

In a first possible implementation, the audio processing 522 may include outputting the stream of audio samples corresponding to the sound (i.e., raw audio-data) as audio information. For example, the stream of audio samples may be output to the ECU 190. In a second possible implementation, the ultrasonic processing 521 may include classifying the audible sound to determine an identity of a sound source. In this implementation, a processor 205 of the smart ultrasonic integrated-circuit 200 may be configured to include a classifier 208 (FIG. 2) configured to recognize the audible sound. For example, the audible sound may be compared (e.g., correlated) with a group of known sound sources to determine which of the known sound sources is most likely the sound source of the audible sound. In this case, the audio processing 522 may be configured to output an identity of the sound source as the audio information.

Figure 6:
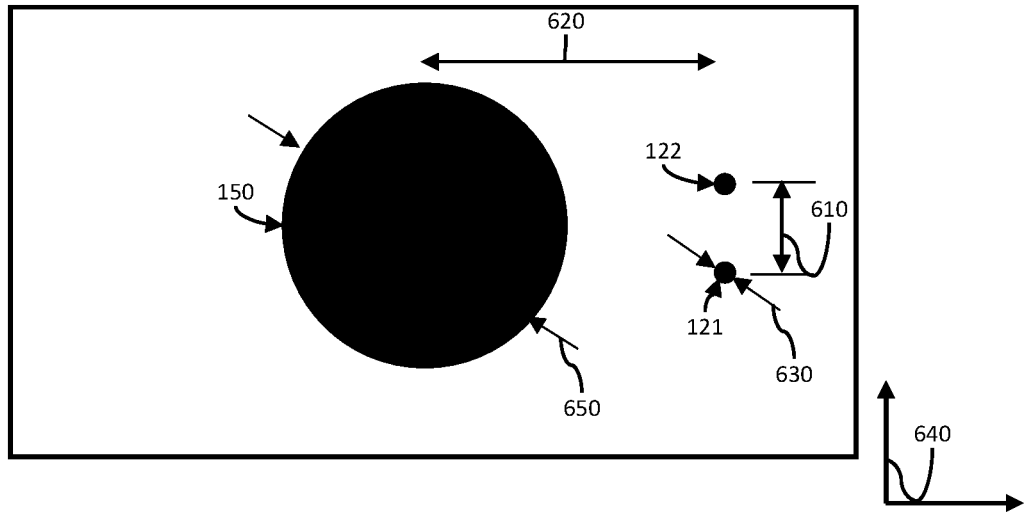
FIG. 6 illustrates a front view of a sensor array module according to a possible implementation of the present disclosure.

An ability to resolve a displacement of the obstacle 130 is based on a spatial arrangement and size of the transducers 191 in the sensor array module 110. FIG. 6 illustrates a front view of a sensor array module according to a possible implementation of the present disclosure. As shown, the first MEMS device 121 and the second MEMS device 122 are arranged in a linear array with an array-spacing 610 between the MEMS devices of the array. The array-spacing 610 can generate a phase shift between the signals received at each MEMS device, which can resolve a displacement of an obstacle in a direction 640 aligned with the linear array. For example, the direction 640 may be a vertical direction with respect to a vehicle 101. In this case, a phase shift between the receive-signals at the MEMS devices can be used to compute a height of the obstacle.

The array-spacing 610 may be less than one wavelength of an ultrasonic-transmit-signal because a MEMS-diameter 630 of each MEMS device may be less than on half the wavelength of the ultrasonic-transmit-signal. In a possible implementation, the array-spacing 610 may be 0.7 millimeters.

The sensor array (i.e., first MEMS device 121 and second MEMS device 122) may be separated from the PZT 150 by a transmit-receive offset 620. The transmit-receive offset may be selected to prevent a leakage signal 151 from generating a response (e.g., ringing) at the first MEMS device 121 and/or the second MEMS device 122 that interferes with the receiving of the echo signal for a desirable sensing range (e.g., 0.07 m<R<10 m)

As shown in FIG. 6, a PZT-diameter 650 of the PZT may be much larger than the MEMS-diameter 630 of the MEMS device. For example, the PZT-diameter 650 may be greater than a wavelength of the ultrasonic-transmit-signal. Accordingly, it may not be possible for the sensor array to include two PZT elements because the PZT-diameter 650 may be too large for an array-spacing 610 that is less than the wavelength. Alternatively, however, it may be possible for a sensor array to include a PZT (receiver) and a MEMS device because the array-spacing 610 of these two transducers may be made less than the wavelength.

Integrating ultrasonic park assist sensors and another kind of sensor, like a microphone/microphones (MEMS device) in a single, multi-sensor module may lead to a lower-cost and/or higher performance than single-sensor solutions.

Separate ultrasonic sensor & microphone in some cases means almost doubling the wiring harness, number of connectors and sensor modules (HW). Merging the two applications into a single smart sensor may offer a solution that balances functionality, performance, and cost.

Ultrasonic sensors can be populated all over the car, where placement of ultrasonic sensors fits the position where microphones may be placed for efficient sound detection (e.g., siren detection, emergency car horn detection, crash detection) and sound source localization. Microphones may be used to detect, for example, to detect a police siren sound and localize it so that the ADAS system can warn a driver of a possible emergency situation.

Such sensors could be mixed with existing ultrasonic parking assist sensors (UPA). The sensors could be placed only at points where an external microphone is needed in order to maximize the overall cost reduction. In one embodiment, a side sensor with a microphone could detect 2D range information for parking and blind spot monitoring. Using the sensor array modules on the corners with conventional ultrasonic sensors in other locations could help reduce the overall ADAS system cost.

An ECU 190 of a vehicle 101 may be configured to perform various applications (i.e., functions) associated advanced driver assistance based on the 2D range information from the smart ultrasonic integrated-circuit 200. Some possible applications of the 2D range information may include (but are not limited to) blind spot monitoring, collision warning/avoidance (e.g., automatic braking), adaptive cruise control, and parking assistance (e.g. automatic parking).

An ECU 190 of a vehicle 101 may be further configured to perform various applications (i.e., functions) associated with advanced driver assistance based on the audio information from the smart ultrasonic integrated-circuit 200. Some possible applications of the audio information may include (but are not limited to) voice interaction, damage detection (breaking glass detection), road condition detection, and emergency vehicle detection.

Figure 7:
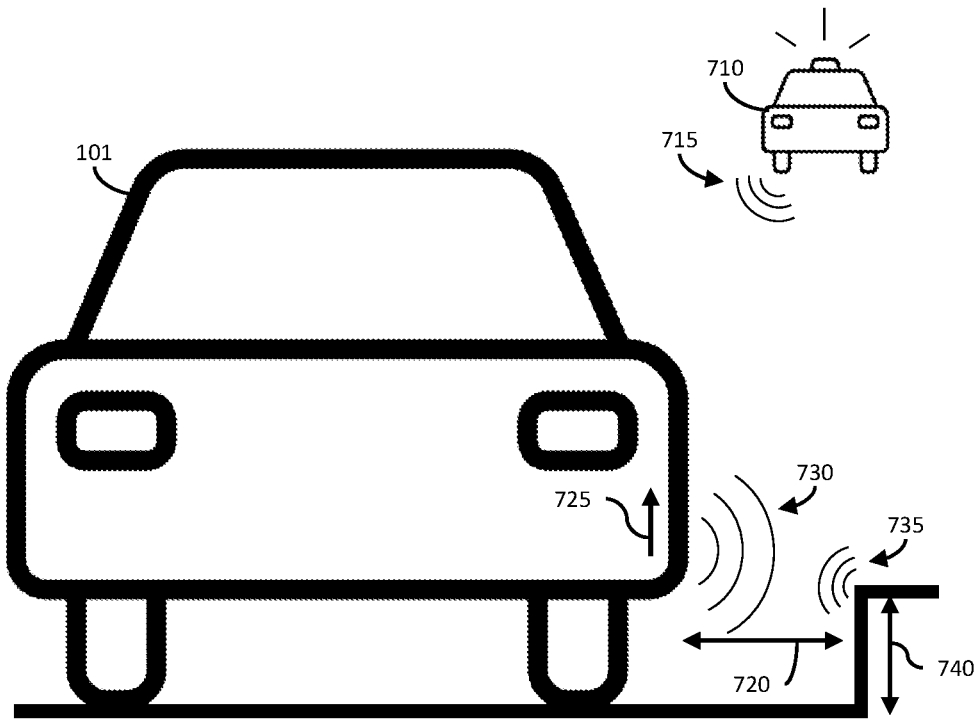
FIG. 7 illustrates possible ADAS applications enabled by the sensor array module according to a possible implementation of the present disclosure.

FIG. 7 illustrates possible ADAS applications enabled by the sensor array module according to a possible implementation of the present disclosure. A vehicle 101 may include a sensor array module. During a park assist operation, an ECU of the vehicle 101 may determine the steering and acceleration necessary to park the vehicle with a range to a curb based on 2D range information from the sensor array module. The sensor array module can include a PZT positioned at a (side) surface of the vehicle 101 and configured to transmit an ultrasonic-transmit-signal 730 towards the curb.

The sensor array module can further include a first MEMS device 121 and a second MEMS device 122 (FIG. 2) at a surface of the vehicle 101 and configured to receive an echo 735 of the ultrasonic-transmit-signal 730 from the curb. The first MEMS device 121 and the second MEMS device 122 can define a MEMS array in a vertical direction 725 that is aligned in a direction corresponding to (e.g., the vertical direction 725 is parallel with) a height 740 of the curb. The sensor array module 110 is configured to output 2D range information corresponding to a range 720 to the curb and a height 740 of the curb.

During the park assist operation (i.e., simultaneous with the range/height sensing), the first MEMS device 121 and the second MEMS device 122 of the sensor array module 110 may receive audio 715 from an emergency vehicle 710 in an environment of the vehicle 101. The audio may be localized based on the angular view (i.e., directivity) of the MEMS array. Audio information may be transmitted to the ECU, which may be configured to generate an emergency vehicle warning based on the audio information.

The audio information and the 2D range information may be communicated to the ECU via a communication interface 210 (FIG. 2) of the smart ultrasonic integrated-circuit 200. The communication interface may be adaptable in order to comport with various communication protocols for different vehicles.

Figure 8:
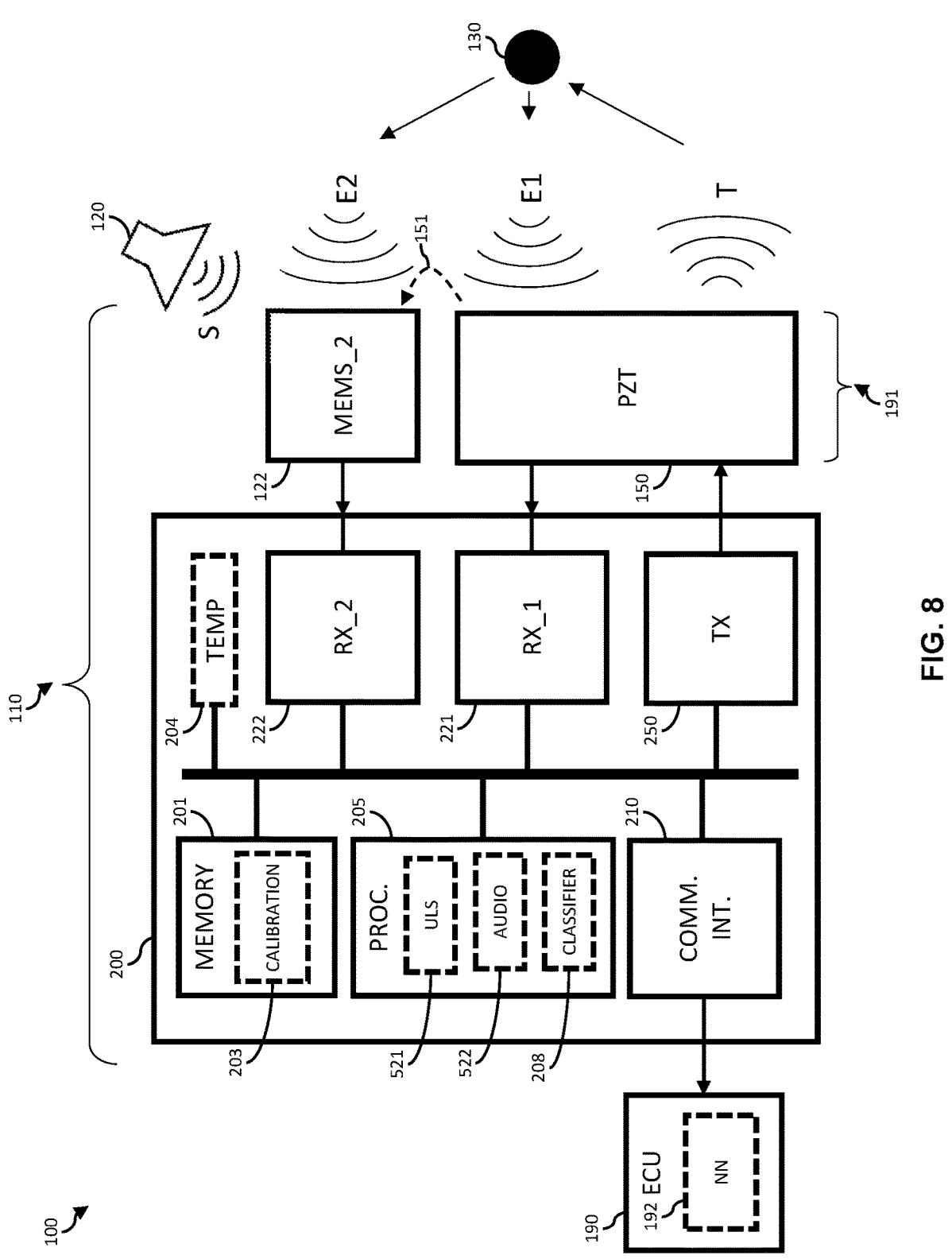
FIG. 8 is a block diagram of a sensor array module for an advanced driver assistance system according to a second possible implementation of the present disclosure.

FIG. 8 is a block diagram of a sensor array module for an advanced driver assistance system according to a second possible implementation of the present disclosure. As shown, the sensor array includes one MEMS receiver (i.e., second MEMS device 122) and a PZT (i.e., PZT 150). The PZT 150 may be configured to transmit the ultrasonic-transmit-signal to the obstacle 130 in a transmit mode and receive a first echo (E1) reflected by the obstacle 130. All other aspects of the operation of the smart ultrasonic integrated-circuit 200 are similar to as described previously in the discussion associated with FIG. 2. For example, a calibration file may include a look-up table that includes an offset phase-shift between the PZT 150 and the second MEMS device 122, which may change according to a temperature. Accordingly, the memory 201 may store a calibration 203 (e.g., look-up table) corresponding to the offset phase-shift between the first PZT 150 and the second MEMS device 122 for a range of temperatures.

Figure 9:
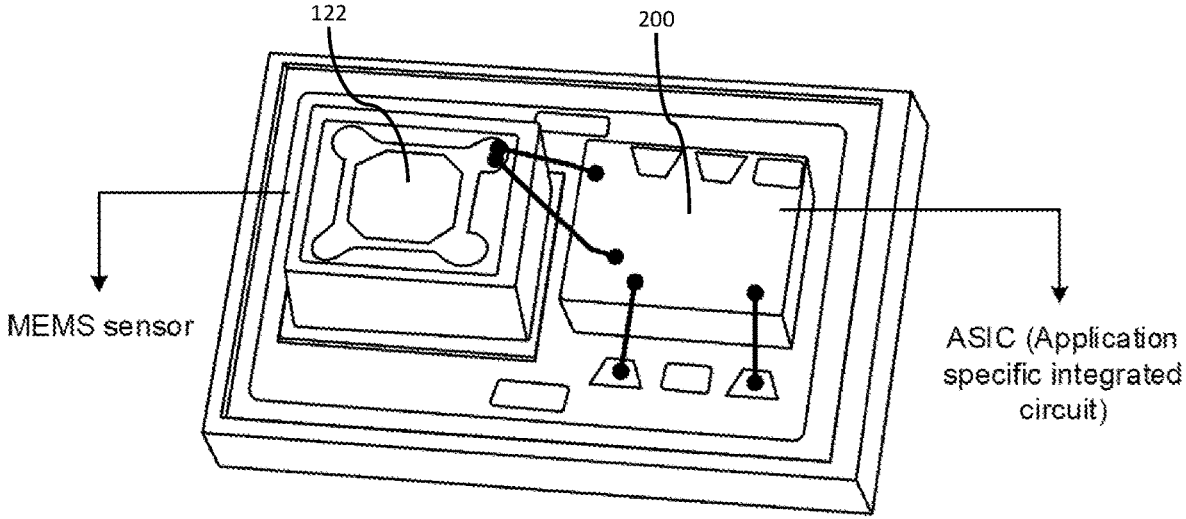
FIG. 9 is a perspective view of an electronic package including a smart ultrasonic integrated-circuit and a MEMS device according to a possible implementation of the present disclosure.

In a possible implementation of sensor array module 110 the MEMS device (e.g., second MEMS device 122) may be in the same electronic package as the smart ultrasonic integrated-circuit 200. FIG. 9 is a perspective view of an electronic package including a smart ultrasonic integrated-circuit and a MEMS device according to a possible implementation of the present disclosure. As shown, the MEMS device (e.g., second MEMS device 122) can be wire bonded to a smart ultrasonic integrated-circuit 200, which can be soldered to a lead frame for electrical connection to a circuit board.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Some implementations may be implemented using various semiconductor processing and/or packaging techniques.

Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A smart ultrasonic integrated-circuit, comprising:
a transmitter coupled to a piezoelectric transducer configured to transmit an ultrasonic-transmit-signal towards an obstacle;
a first receiver configured to receive a first receive-signal from a first MEMS device, the first receive-signal including a first ultrasonic portion and a first audio portion;
a second receiver configured to receive a second receive-signal from a second MEMS device, the second receive-signal including a second ultrasonic portion and a second audio portion; and
a processor configured to:
process the first ultrasonic portion of the first receive-signal and the second ultrasonic portion of the second receive-signal to determine two-dimensional range information for the obstacle;
process the first audio portion of the first receive-signal and the second audio portion of the second receive-signal to determine audio information for a sound source; and
output the two-dimensional range information and the audio information.

2. The smart ultrasonic integrated-circuit according to claim 1, wherein the processor is further configured to:
capture a first ultrasonic-echo included in the first receive-signal;
capture a second ultrasonic-echo included in the second receive-signal;
determine a phase shift between the first ultrasonic-echo and the second ultrasonic-echo; and
determine a time-of-flight based on the first ultrasonic-echo or the second ultrasonic-echo.

3. The smart ultrasonic integrated-circuit according to claim 2, wherein the processor is further configured to:

output the time-of-flight and the phase shift as the two-dimensional range information.

4. The smart ultrasonic integrated-circuit according to claim 2, wherein the processor is further configured to:
determine a range to the obstacle based on the time-of-flight;
determine a height of the obstacle based on the phase shift; and
output the range and the height as the two-dimensional range information.

5. The smart ultrasonic integrated-circuit according to claim 1, wherein the processor is further configured to:
capture an audible sound included in the first receive-signal or the second receive-signal.

6. The smart ultrasonic integrated-circuit according to claim 5, wherein the processor is further configured to:
output raw audio-data corresponding to the audible sound as the audio information.

7. The smart ultrasonic integrated-circuit according to claim 5, wherein the processor is further configured to:
classify the audible sound to determine an identity of the sound source; and
output the identity as the audio information.

8. The smart ultrasonic integrated-circuit according to claim 1, wherein:
the first receiver is configured to capture the first ultrasonic portion of the first receive-signal and the first audio portion of the first receive-signal simultaneously; and
the second receiver is configured to capture the second ultrasonic portion of the second receive-signal and the second audio portion of the second receive-signal simultaneously.

9. A smart ultrasonic integrated-circuit, comprising:
a transmitter coupled to a piezoelectric transducer configured to transmit an ultrasonic-transmit-signal towards an obstacle;
a first receiver configured to receive a first receive-signal from the piezoelectric transducer, the first receive-signal including a first ultrasonic-echo;
a second receiver configured to receive a second receive-signal from a MEMS device, the second receive-signal including a second ultrasonic-echo and an audio signal; and
a processor configured to:
determine a two-dimensional range based on the first ultrasonic-echo and the second ultrasonic-echo;
determine audio information based on the audio signal; and
output the two-dimensional range and the audio information.

10. The smart ultrasonic integrated-circuit according to claim 9, wherein the processor is further configured to:
capture a leakage signal included in the second receive-signal, the leakage signal received by the MEMS device while the piezoelectric transducer is in a transmit mode; and
determine an operating characteristic of the piezoelectric transducer based on the leakage signal.

11. The smart ultrasonic integrated-circuit according to claim 9, further including:
a temperature sensor; and
a memory that is configured to store a calibration file corresponding to an offset phase-shift between the piezoelectric transducer and the MEMS device.

12. The smart ultrasonic integrated-circuit according to claim 9, wherein the processor is further configured to:

determine a range to the obstacle based on a time-of-flight of the first ultrasonic-echo or the second ultrasonic-echo;

determine a height of the obstacle based on a phase shift between the first ultrasonic-echo and the second ultrasonic-echo; and output the range the height as the two-dimensional range.

13. The smart ultrasonic integrated-circuit according to claim 9, wherein the processor further includes a classifier configured to:

recognize the audio signal; and output an identity of a sound source of the audio signal as the audio information.

14. The smart ultrasonic integrated-circuit according to claim 9, wherein the processor is further configured to:

output a stream of audio samples corresponding to the audio signal as the audio information.

15. The smart ultrasonic integrated-circuit according to claim 9, wherein the second receiver includes an analog-to-digital converter configured to capture the second ultrasonic-echo and the audio signal simultaneously from the second receive-signal.

16. The smart ultrasonic integrated-circuit according to claim 9, wherein the smart ultrasonic integrated-circuit is disposed in an electronic package, the MEMS device is wire bonded to the smart ultrasonic integrated-circuit within the electronic package.

17. A non-transitory computer-readable medium storing instructions that, when executed by a processor of a smart ultrasonic integrated-circuit, cause the smart ultrasonic integrated-circuit to:

transmit, via a transmitter coupled to a piezoelectric transducer, an ultrasonic-transmit-signal towards an obstacle;

receive, via a first receiver, a first receive-signal from a first MEMS device, the first receive-signal including a first ultrasonic portion and a first audio portion;

receive, via a second receiver, a second receive-signal from a second MEMS device, the second receive-signal including a second ultrasonic portion and a second audio portion;

process the first ultrasonic portion of the first receive-signal and the second ultrasonic portion of the second receive-signal to determine two-dimensional range information for the obstacle;

process the first audio portion of the first receive-signal and the second audio portion of the second receive-signal to determine audio information for a sound source; and output the two-dimensional range information and the audio information.

18. The non-transitory computer-readable medium according to claim 17, wherein the instructions further cause the smart ultrasonic integrated-circuit to:

capture a first ultrasonic-echo included in the first receive-signal;

captured a second ultrasonic-echo included in the second receive-signal;

determine a phase shift between the first ultrasonic-echo and the second ultrasonic-echo;

determine a time-of-flight based on the first ultrasonic-echo of the second ultrasonic-echo; and output the time-of-flight and the phase shift as the two-dimensional range information.

19. The non-transitory computer-readable medium according to claim 17, wherein the instructions further cause the smart ultrasonic integrated-circuit to:

capture a first ultrasonic-echo included in the first receive-signal;

capture a second ultrasonic-echo included in the second receive-signal;

determine a phase shift between the first ultrasonic-echo and the second ultrasonic-echo;

determine a time-of-flight based on the first ultrasonic-echo or the second ultrasonic-echo;

determine a range to the obstacle based on the time-of-flight;

determine a height of the obstacle based on the phase shift; and output the range and the height as the two-dimensional range information.

20. The non-transitory computer-readable medium according to claim 17, wherein the instructions further cause the smart ultrasonic integrated-circuit to:

capture an audible sound included in the first receive-signal or the second receive-signal; and output raw audio-data corresponding to the audible sound as the audio information.

21. The non-transitory computer-readable medium according to claim 17, wherein the instructions further cause the smart ultrasonic integrated-circuit to:

capture an audible sound included in the first receive-signal or the second receive-signal;

classify the audible sound to determine an identity of the sound source; and output the identity as the audio information.

* * * * *